Patented Oct. 13, 1942

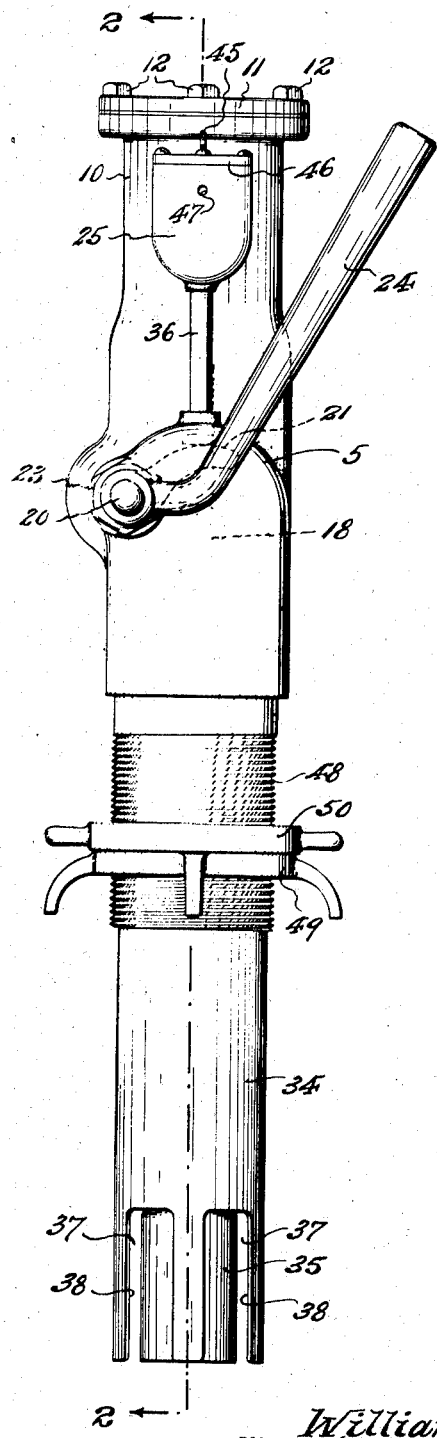

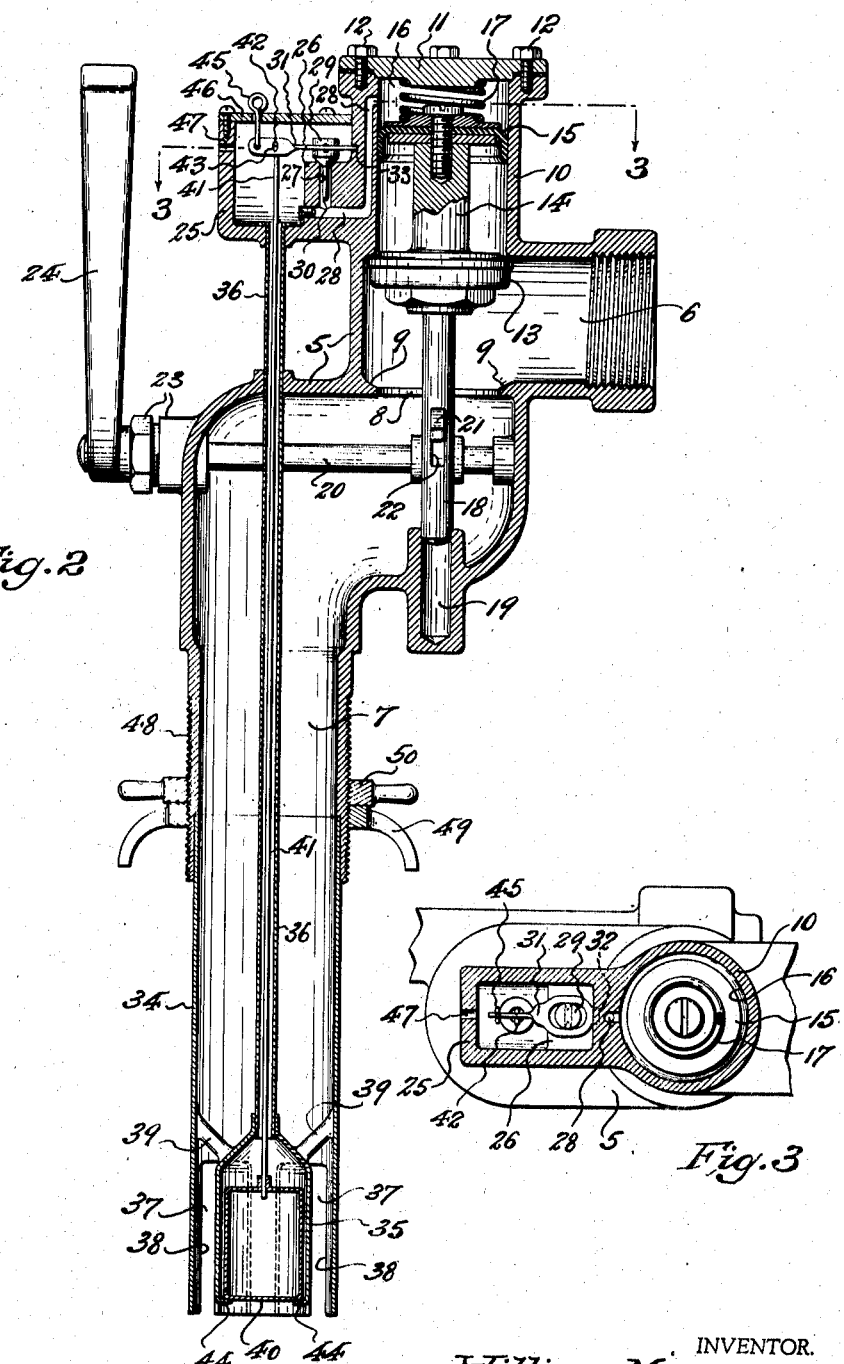

2,298,801

UNITED STATES PATENT OFFICE 2,298,801

SELF-CLOSING BARREL FILLER

William Meyer, East Orange, N. J., assignor to A. W. Wheaton Brass Works, Newark, N. J., a corporation of New Jersey Application October 4, 1941, Serial No. 413,600

11 Claims. (Cl. 226—127)

This invention relates to improvements in self-closing faucets or valves of the barrel filler type; and the invention has reference, more particularly, to improvements in means for holding the faucet or valve open during the delivery of liquid therethrough into a barrel, tank or other container desired to be filled, together with means for automatically closing the same to shut off liquid delivery as soon as the barrel or the like being served is full.

This invention has for an object to provide, in a self-closing faucet or valve of the barrel filler type, a novel internal means for holding the same open which operates on a vacuum principle, thus avoiding necessity for use of external mechanical trips or latches cooperative with the valve lifting hand lever, the use of which involves risk of accidental or premature tripping and closing of the faucet or valve before the barrel being served is full; the invention, therefore, has for a further object to provide concealed or internal means for holding the faucet or valve open which is built into the faucet or valve body and which, consequently, is efficiently guarded against accidental or premature release.

This invention has for another object to provide a faucet with a closed cylinder chamber above its valve port and the spring-closed valve which is cooperative with the latter, said valve having a plunger slidable in said cylinder chamber, whereby to expel air therefrom when the valve is lifted to faucet opening position, and said faucet further including air discharge means controlled by an outwardly opening check-valve, whereby to maintain a partial vacuum or reduced atmospheric pressure within said cylinder chamber effective to hold the plunger in raised position and the faucet valve against closing movement, and said faucet being further provided at its discharge end with a float device operatively connected with means to open said check-valve to the readmission of air into said cylinder chamber, whereby to break the vacuum established therein, and thereby permit the faucet valve to close under the action of its spring.

Other objects of this invention, not at this time more particularly enumerated, will be understood from the following detailed description of the same.

An illustrative embodiment of this invention is shown in the accompanying drawings, in which:

Fig. 1 is a front elevational view of the novel barrel filler type faucet according to this invention; Fig. 2 is a longitudinal sectional view of the same, taken on line 2—2 in Fig. 1; and Fig. 3 is a fragmentary horizontal sectional view, taken on line 3—3 in Fig. 2.

Similar characters of reference are employed in the hereinabove described views, to indicate corresponding parts.

Referring to the drawings, the reference character 5 indicates a faucet body having a lateral intake passage 6 and a longitudinal outlet or discharge passage 7. Intermediate said passages 6 and 7 is a valve port 8 bounded by a valve seat 9. Formed in connection with said faucet body 5, so as to be disposed above and in vertical alignment with said valve port 8, is a cylinder portion 10, the upper free end of which is closed by a head or cap member 11, the latter being secured in place by bolts 12, or in any other suitable manner.

Arranged within the faucet body 5, so as to be movable toward and from the valve port 8, and so as to normally seat itself on the valve seat 9 whereby to close said valve port 8, is a faucet valve 13. Extending upwardly from said faucet valve 13 into the interior of said cylinder portion 10 is a plunger 14, the same having a piston member 15 to slidably engage the walls of said cylinder portion 10. The interior of said cylinder portion 10, above the piston member 15, provides an air chamber 16. A compression spring 17 is arranged between the cylinder head or cap member 11 and said piston member 15, the downward tensional thrust of which is operative to move downwardly said piston member, plunger and faucet valve, whereby to yieldably seat the latter on the valve seat 9 in closed relation to the valve port 8.

Extending downwardly from said faucet valve 13 is an axial stem 18, the free end portion of which is slidably supported and guided by a bearing portion 19 with which the faucet body 5 is provided.

Suitably journaled in the faucet body 5 to extend therethrough adjacent to the faucet valve stem 18 and in transverse relation thereto, is a shaft 20 upon which is fixed a lift cam 21. This lift cam 21 engages through a slot 22 with which the faucet valve stem 18 is provided. One end of said shaft 20 projects exteriorly from the faucet body, being arranged to extend through a leak-proofing stuffing-box 23 with which said faucet body is provided. Affixed upon the exterior end of said shaft 20 is a hand-lever 24 by which the same may be rotated to cause the lift cam 21 to exert lifting pressure upon the faucet valve stem 18 whereby to raise the faucet valve 13 off the seat 9, and thus open the port 8 to the flow of liquid through the faucet.

Connected with the cylinder portion 10 of the faucet body, so as to project laterally therefrom, above and in substantial alignment with that portion of the faucet body 5 from which extends the outlet or discharge passage 7 thereof, is a housing member 25. Disposed within said housing member 25 is a check-valve block 26 having a perpendicular air port 27. Formed in the wall of the cylinder portion 10 is an air passage 28, which communicates at one end with the air chamber 16 and at the other end with said air port 27. Cooperating with said air port 27, to open and close the same under proper conditions, is a check-valve 29, the stem 30 of which loosely engages in said air port 27, whereby to hold and guide said check-valve on its operative relation thereto. Said check-valve 29 is pivotally engaged by a lever member 31, the inner end 32 of which is fulcrumed in a fulcrum notch 33 provided in the rear end wall of said housing member 25. It will be obvious, however, that said lever member 31 may be pivoted for swing in vertical plane in any other suitable manner.

Connected with the discharge end of the faucet body 5, to form an extension of its outlet or discharge passage 7, is a tubular spout member 34. Supported within the free end portion of said spout member 34 is a downwardly open float housing 35, to the upper end of which is connected the lower end of a tubular conduit 36, which thus communicates with the interior of said float housing. This conduit 36 extends axially and upwardly through the spout member 34 and faucet body outlet or discharge passage 7, being arranged to pass through the wall of the faucet body 5 and thence to and through the wall of the housing member 25, whereby its upper end is connected in communication with the interior of the latter.

In the illustrative form and arrangement of the float housing 35 as shown in the drawings, the same is of reduced diameter as compared with the diameter of the spout member 34, thus providing an intermediate annular spout discharge passage 37 which communicates with lateral outlet openings 38 with which the wall of said spout member is provided. Said float housing 35 is supported by means of spider arms 39 which extend between the same and the spout member wall. The described arrangement whereby the spout member discharge outlet is formed, is but illustrative and constitutes only one of various ways in which the liquid discharging from the spout member may by-pass the float housing or otherwise flow without being unduly impeded by the latter.

Disposed within said float housing 35 is a float member 40 to which is rigidly connected a float rod or link 41. This float rod or link extends upwardly through the interior of said conduit 36, so that its upper end emerges within the interior of the housing member 25. Said upper end of the float rod or link terminates in an angular coupler element 42, which engages in a slot 43 in the free end portion of the check-valve lever member 31, in such manner as to admit of limited play in the connection, whereby said lever member 31 and check-valve 29 connected therewith is free to permit check-valve opening movement, at proper times, independently of and unimpeded by the connection of said lever member 31 with the float rod or link 41. Means are provided for supporting the float member 40 and its rod or link 41 in a normal initial position, whereby, when so disposed, the weight thereof will not be exercised on the check-valve lever member, or the desired permissive play of the latter interfered with. The means for this purpose is subject to various embodiment. Illustrative of one means to such end is the provision of supporting lugs 44 which are struck from the lower margins of the float housing and inturned beneath and in supporting relation to the float member.

Connected with free end portion of the lever member 31 is a pull-piece 45, which projects exteriorly through a detachable cover member 46 with which the housing member 25 is provided. This pull-piece 45 may be utilized to trip the check-valve 29 to manually open the same for admission of air into the air chamber 16, should it be desired to manually close the faucet valve at any time.

Ingress and egress of air to the interior of the housing member 25 may take place through the conduit 36 and through the opening in the cover member 46 through which said pull-piece 45 extends. If desired, however, direct communication between the interior of the housing member 25 and the external atmosphere may be had by providing an air opening 47 in a wall of said housing member 25.

The discharge end portion of the faucet body 5 is preferably provided with external screw-threads 48, whereby a faucet supporting spider 49 may be adjustably mounted thereon. Such spider 49 is adapted to engage the exterior of a barrel, tank or the like being served by the faucet, whereby to support the latter so as to dispose the spout member 34 in a desired inserted position within the interior of said barrel, tank or the like. Said spider 49 may be secured in a desired adjusted position on the faucet body by means of a lock ring 50 which is engaged on said screw-threads 48 for cooperation with said spider.

In the operation of the faucet, after the spout member 34 is inserted in the barrel, tank or other container desired to be filled, the hand lever 24 is manipulated to turn the shaft 20, whereby to cause the cam 21 to be up-swung so as to exert a lift upon the faucet valve stem 18. The upthrust of said stem 18 lifts the faucet valve 13 from its seat 9, thereby opening the valve port 8 to the flow of liuqid through the faucet for delivery thereof into the barrel, tank or other container being served. The rising of the faucet valve 13 is accompanied by an upward stroke of the piston member 15 in the cylinder portion 10 against the tension of the spring 17. Such upward movement of the piston-member 15 drives the air from the air chamber 16 outwardly through the air passage 28 and past the check-valve 29; the latter lifting and thus yielding to the outflow of air through the air port 27. Owing to the loose connection or play permitted between the lever member 31 and the float rod or link 41, this yielding or opening movement of the check-valve 29, under the pressure of air outwardly driven from the air chamber 16, is unimpeded. As soon as the faucet valve and piston member 15 reaches the limit of their up-stroke, so that pressure of outwardly moving air upon the check-valve 29 ceases, said check-valve, by its weight, drops and closes the air port 27 against return of expelled air into the air chamber 16, said check-valve being held closed by atmospheric pressure. As a consequence of this, a partial vacuum or reduced air pressure condition would be established within the chamber 16 by any downward movement of piston member 15, thus unbalancing the pressures exerted upon opposite sides of the piston-member 15, so that major pressure would be exerted by the atmosphere upon the underside thereof, whereby the same, and consequently the faucet valve 13 is held in uplifted position to which they have been moved, and therefore said faucet valve is automatically maintained in its open condition to permit continuous flow of the liquid being served therethrough into the barrel, tank or other container into which the liquid is discharged.

The liquid thus discharged through the faucet into the barrel, tank or other container rises within the latter until it reaches and buoys up the float member 40. The upward movement of said float member is transmitted through the float rod or link 41 to the lever member 31, thereby upswinging the latter so as to lift the check-valve 29, and thus open the air port 27 and passage 28 to influx of air into the air chamber 16. As air is thus readmitted to the air chamber 16, the partial vacuum established therein is broken, and an atmospheric pressure on opposite sides of the piston-member 15 is again balanced, whereupon the downward thrust of the spring 17 causes the piston member 15 and faucet valve 13 to descend, and the latter to again seat itself upon the seat 9 so as to close the port 8, and thereby automatically shut off flow of liquid through the faucet as soon as the barrel, tank or other container being served is filled.

From the above it will be apparent that a very efficient automatically controlled self-closing faucet of the barrel filler type is provided, wherein the controlling means is adequately shielded against accidental or premature operation, since it is internally contained within the faucet body structure.

If, for any reason, it should be desired however to close the faucet before the barrel, tank or other container being served therethrough is entirely full, this may be manually accomplished by pulling upward upon the pull-piece 45, whereby to up-swing the lever member 31 and unseat the check-valve 29 to readmit air through the air port 27 and passage 28 into the air chamber 16, with resultant freeing of the piston-member 15 and faucet valve 13 for descent and closing effect of the latter.

It will be obvious that various changes could be made in the above described constructions, and that widely different embodiments of this invention could be made without departing from the scope thereof as defined in the following claims. It is therefore intended that all matter contained in the foregoing description or shown in the accompanying drawings shall be interpreted as illustrative and not in a limiting sense.

I claim:

1. In a faucet of the kind described, a spring closed faucet valve means, manipulatable means to move said faucet valve means to open position, means to provide an air chamber from which air may be expelled by opening movement of said faucet valve means for the purposes described, air discharge means in communication with said air chamber and including an outwardly opening check-valve, and float controlled means for opening said check-valve for readmission of air into said air chamber.

2. In a faucet of the kind described, a spring closed faucet valve means, manipulatable means to move said faucet valve means to open position, means to provide an air chamber from which air may be expelled by opening movement of said faucet valve means for the purposes described, air discharge means in communication with said air chamber and including an outwardly opening check-valve, float controlled means for opening said check-valve for readmission of air into said air chamber, and optionally usable manipulatable means for opening said check-valve for readmission of air into said air chamber.

3. In a faucet of the kind described, a spring closed faucet valve means, manipulatable means to move said faucet valve means to open position, means to provide an air chamber from which air may be expelled by opening movement of said faucet valve means for the purposes described, air discharge means in communication with said air chamber and including an outwardly opening check-valve, a pivoted lever means operative upon said check-valve, a lever means actuating float located adjacent to the discharge portion of the faucet, said float having a rod connected with said lever means whereby to move the latter to open said check-valve for readmission of air into said air chamber, and the connection between said lever means and rod being such as to admit of free movement by the lever means and check-valve under pressure of air expelled from said air chamber.

4. In a faucet of the kind described, a spring closed faucet valve means, manipulatable means to move said faucet valve means to open position, means to provide an air chamber from which air may be expelled by opening movement of said faucet valve means for the purpose described, air discharge means in communication with said air chamber and including an outwardly opening check-valve, a pivoted lever means operative upon said check-valve, a lever means actuating float located adjacent to the discharge portion of the faucet, said float having a rod connected with said lever means whereby to move the latter to open said check-valve for readmission of air into said air chamber, and the connection between said lever means and rod being such as to admit of free movement of the lever means and check-valve under pressure of air expelled from said air chamber, and optionally usable manipulatable means for moving said lever means to open said check-valve for readmission of air into said air chamber.

5. In a faucet of the kind described, a spring closed faucet valve, manipulatable means to move said faucet valve to open position, means to provide an air chamber, air discharge means in communication with said air chamber and including an outwardly opening check-valve, means operated by the opening movement of said faucet valve to expel air from said chamber through said air discharge means and past said check-valve, whereby partial vacuum established within said air chamber is effective upon said air expelling means and faucet valve to hold the latter in open position against the tension of its closing spring, and float controlled means for opening said check-valve for readmission of air into said air chamber to break said vacuum, the float of which is located adjacent to the discharge portion of the faucet.

6. In a faucet of the kind described, a spring closed faucet valve, manipulatable means to move said faucet valve to open position, means to provide an air chamber, air discharge means in communication with said air chamber and including an outwardly opening check-valve, means operated by the opening movement of said faucet valve to expel air from said chamber through said air discharge means and past said check-valve, whereby partial vacuum established within said air chamber is effective upon said air expelling means and faucet valve to hold the latter in open position against the tension of its closing spring, a pivoted lever means operative upon said check-valve, a lever means actuating float located adjacent to the discharge portion of the faucet, said float having a rod connected with said lever means whereby to move the latter to open said check-valve for readmission of air into said air chamber, and the connection between said lever means and rod being such as to admit of free movement of the lever means and check-valve under pressure of air expelled from said air chamber.

7. In a faucet of the kind described, a spring closed valve, manipulatable means to move said faucet valve to open position, means to provide an air chamber, air discharge means in communication with said air chamber and including an outwardly opening check-valve, means operated by the opening movement of said faucet valve to expel air from said chamber through said air discharge means and past said check-valve, whereby partial vacuum established within said air chamber is effective upon said air expelling means and faucet valve to hold the latter in open position against the tension of its closing spring, a pivoted lever means operative upon said check-valve, a lever means actuating float located adjacent to the discharge portion of the faucet, said float having a rod connected with said lever means whereby to move the latter to open said check-valve for readmission of air into said air chamber, the connection between said lever means and rod being such as to admit of free movement of the lever means and check-valve under pressure of air expelled from said air chamber, and optionally usable manipulatable means for moving said lever means to open said check-valve for readmission of air into said air chamber.

8. A faucet body having a valve port, said body including an air chamber aligned with said valve port, a faucet valve to close said valve port, a piston member carried by said faucet valve and slidable in said air chamber, spring means to move said piston member and faucet valve in valve port closing direction, air discharge means in communication with said air chamber including an outwardly opening check-valve, manipulatable means to move said faucet valve to open said valve port wtih accompanying movement of said piston member to expel air from said air chamber through said air discharge means and past said check-valve, and float controlled means for opening said check-valve for readmission of air into said air chamber, the float of which is located adjacent to the discharge portion of said faucet body.

9. A faucet body having a valve port, said body including an air chamber aligned with said valve port, a faucet valve to close said valve port, a piston member carried by said faucet valve and slidable in said air chamber, spring means to move said piston member and faucet valve in valve port closing direction, air discharge means in communication with said air chamber including an outwardly opening check-valve, manipulatable means to move said faucet valve to open said valve port which accompanying movement of said piston member to expel air from said air chamber through said air discharge means and past said check-valve, float controlled means for opening said check-valve for readmission of air into said air chamber, the float of which is located adjacent to the discharge portion of said faucet body, and optionally usable manipulatable means for opening said check-valve for readmission of air into said air chamber.

10. In a faucet of the kind described, a spring closed faucet valve means, manipulatable means to move said faucet valve means to open position, means to provide an air chamber from which air may be expelled by opening movement of said faucet valve means for the purposes described, an air venting housing member offset from said air chamber means so as to be aligned more or less with the discharge end portion of the faucet, air discharge means in communication with said air chamber including an air port located within said housing member, an outwardly opening check-valve to close said air port, a lever means pivoted within said housing member and operatively connected with said check-valve, a lever means actuating float located adjacent to the discharge outlet of the faucet discharge end portion, said float having a rod connected with said lever means whereby to move the latter to open said check-valve for readmission of air into said air chamber, the connection between said lever means and rod being such as to admit of free movement of the lever means and check-valve under pressure of air expelled from said air chamber, means to house said float, and means extending between said housing means and said housing member to enclose said float rod.

11. In a faucet of the kind described, a spring closed faucet valve means, manipulatable means to move said faucet valve means to open position, means to provide an air chamber from which air may be expelled by opening movement of said faucet valve means for the purposes described, an air venting housing member offset from said air chamber means so as to be aligned more or less with the discharge end portion of the faucet, air discharge means in communication with said air chamber including an air port located within said housing member, an outwardly opening check-valve to close said air port, a lever means pivoted within said housing member and operatively connected with said check-valve, a lever means actuating float located adjacent to the discharge outlet of the faucet discharge end portion, said float having a rod connected with said lever means whereby to move the latter to open said check-valve for readmission of air into said air chamber, the connection between said lever means and rod being such as to admit of free movement of the lever means and check-valve under pressure of air expelled from said air chamber, means to house said float, means extending between said housing means and said housing member to enclose said float rod, and optionally usable manipulatable means for moving said lever means to open said check-valve for readmission of air into said air chamber.

WILLIAM MEYER.